United States Patent [19]

Pearl et al.

[11] Patent Number: 4,603,777

[45] Date of Patent: Aug. 5, 1986

[54] CONVEYOR HANGER WITH SPRING CLIP GRIPPER

[75] Inventors: David R. Pearl; Lawrence S. Wolfson, both of West Hartford, Conn.

[73] Assignee: Gerber Garment Technology, Inc., Tolland, Conn.

[21] Appl. No.: 651,424

[22] Filed: Sep. 17, 1984

[51] Int. Cl.$^4$ .............................................. B65G 47/74
[52] U.S. Cl. .............................. 198/803.8; 294/103.1; 294/81.6; 294/143
[58] Field of Search ............... 198/695, 653, 650, 473, 198/648, 678, 479, 803.8; 294/103.1, 81.6, 143, 162; 248/316.7; 211/89, 45

[56] References Cited

U.S. PATENT DOCUMENTS

| | | | |
|---|---|---|---|
| 1,522,923 | 1/1925 | Smith et al. | 198/650 |
| 2,209,953 | 8/1940 | Youngquist | 211/89 X |
| 3,184,042 | 5/1965 | Rutkovsky et al. | 198/678 X |
| 3,960,264 | 6/1976 | Carbine et al. | 198/695 X |
| 4,515,277 | 5/1985 | Leth-S rensen | 211/45 |

Primary Examiner—Joseph E. Valenza
Assistant Examiner—D. Glenn Dayoan
Attorney, Agent, or Firm—McCormick, Paulding & Huber

[57] ABSTRACT

A hanger for use with a conveyor for transporting pieces of limp sheet-like work material from place to place in a garment making plant or the like includes a hanger rod for attaching the hanger to a conveyor trolley and a rigid body having at least one gripper, and preferably several grippers, each for releasably holding a workpiece unit to the hanger. Each gripper is of a simple construction including a fixed generally vertical gripping surface on one downwardly extending portion of the body and a cooperating spring clip attached to the lower end of a second downwardly extending body portion spaced laterally of the first downwardly extending portion.

4 Claims, 4 Drawing Figures

U.S. Patent   Aug. 5, 1986   4,603,777
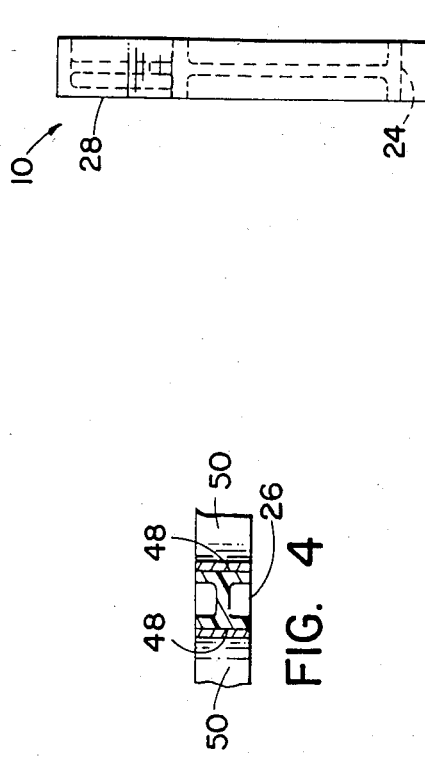
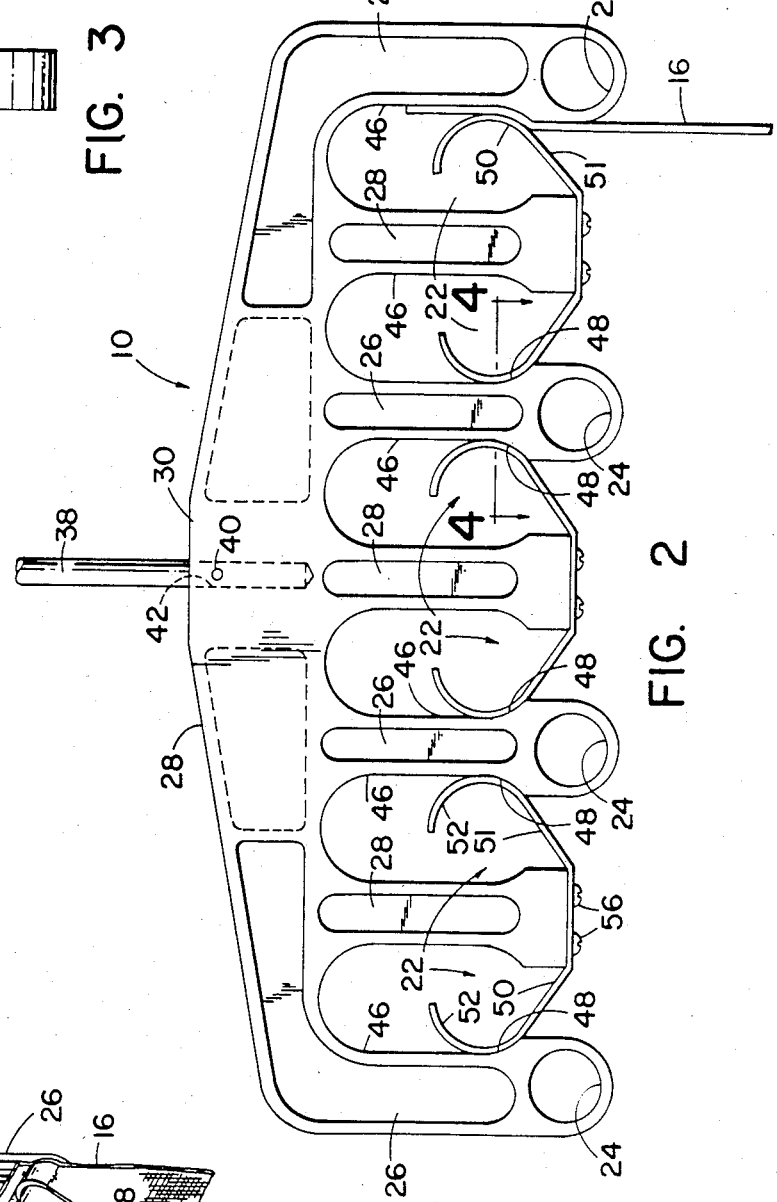
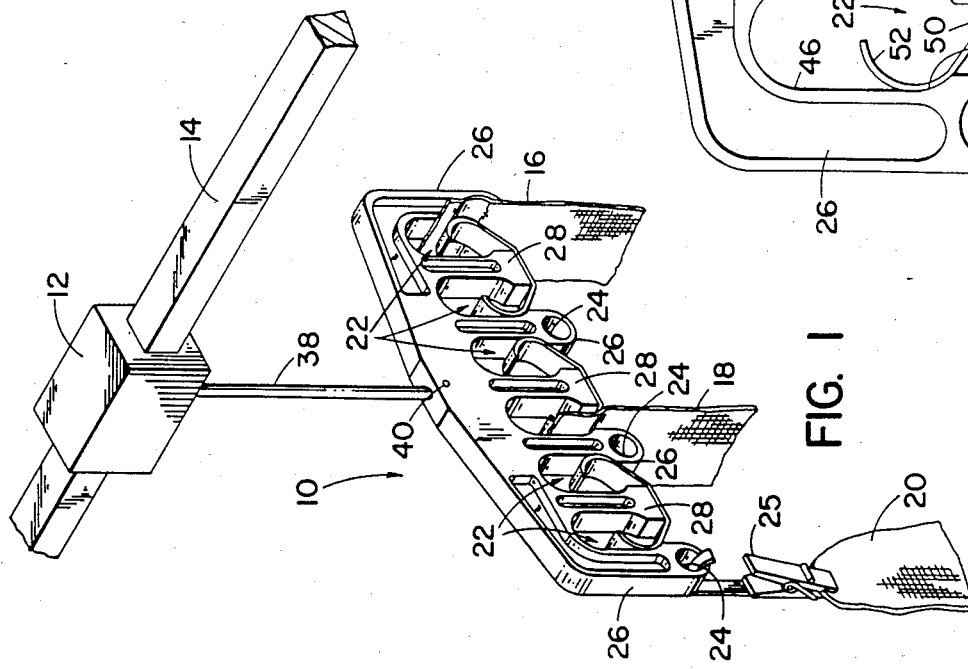

CONVEYOR HANGER WITH SPRING CLIP GRIPPER

BACKGROUND OF THE INVENTION

This invention relates to a hanger for holding pieces of limp material such as textile garment pieces either as individual pieces or as groups or stacks of such pieces and for attachment to a conveyor trolley for moving the pieces from work station to work station in a conveyorized garment making plant or the like, and deals more particularly with an improved construction of a gripper used on such a hanger for holding the loaded workpieces to the hanger.

In the garment making industry, the upholstery industry and other industries involved in making articles from pieces of fabric or other limp sheet material by performing various operations on such pieces, such as seam sewing, hemming, embroidering, buttonholing, appliquing, etc., at different work stations, it is known to convey pieces of work material in various different states of completion, and as individual pieces or stacks or groups of pieces, from work station to work station by a conveyor system including overhead rails and switches, trolleys riding on the rails and hangers hanging from the trolleys, with the hangers having some means for releasably holding the workpieces to the hanger. Preferably, the holding means of each hanger should be able to hold workpieces of different size and weight, should be able to hold either a single workpiece or a stack or group of such workpieces, should be easy to operate as far as the loading and unloading of workpieces are concerned, and should reliably hold the workpieces to the hanger between the loading and unloading operations. Further, since a conveyor system of the type described normally uses a relatively large number of hangers, the hangers should be of relatively simple, economical construction. A hanger may be designed to hold a single workpiece or a single stack of such workpieces, but preferably it is designed so to allow it to hold several workpieces or stacks or groups of such pieces at one time.

The general aim of this invention is therefore to provide a hanger for use in a conveyorized system of the foregoing character having the above-mentioned requirements. A more particular object of the invention is to provide such a hanger including an improved gripper for holding a single workpiece or a group or a stack of workpieces to the hanger which hanger is very easy to operate, capable of reliably holding the inserted workpiece or workpieces to the hanger and is of a very simple, ecomonical construction.

Other objects and advantages of the invention will be apparent from the following description and from the accompanying drawings forming a part thereof.

SUMMARY OF THE INVENTION

The invention resides in a hanger for a conveyorized system for transporting pieces of limp sheet material from work station to work station and involves an improved gripper for holding a workpiece or stack of workpieces to the hanger.

More specifically, the invention resides in the gripper of the hanger including an upper portion and a first portion extending downwardly from the upper portion providing a generally vertical fixed gripping face with a laterally outwardly curved lower end portion. A second portion of the hanger body extends downwardly from the upper portion in generally parallel, laterally spaced relation to the first downwardly extending portion, and a spring clip is attached to the lower end of this second portion which spring clip extends upwardly from the lower end of the second portion toward the first portion and terminates in a curved end portion generally conforming to and overlying the curved end portion of the fixed gripping face of the first portion with the springiness of the clip resiliently urging the curved end portion of the clip into engagement with the curved end portion of the fixed gripping face.

The invention still more specifically resides in the hanger having a plurality of such grippers and especially in two of such grippers being formed by two downwardly extending first body portions separated by a single intermediate downwardly extending second body portion carrying at its lower end both of the spring clips for two grippers, the two such spring clips being preferably made from a single piece of spring material.

BRIEF DESCRIPTION OF THE DRAWINGS

FIG. 1 is a perspective view showing a portion of a conveyor system using a hanger embodying the present invention, the parts of the conveyor apart from the hanger being shown only schematically.

FIG. 2 is a front elevational view of the hanger of FIG. 1.

FIG. 3 is a side view of the hanger of FIG. 1 taken looking toward the left in FIG. 2.

FIG. 4 is a horizontal sectional view taken on the line 4—4 of FIG. 2.

DETAILED DESCRIPTION OF THE PREFERRED EMBODIMENT

Referring to FIG. 1, a hanger embodying the invention is illustrated at 10 and is connected to a trolley 12 riding on a rail 14, all of which may form a part of a conveyor system for transporting limp sheet material, such as indicated at 16, 18 and 20, from work station to work station in a garment making plant or the like. The trolley 12 and track 14 may take any one of various well-known forms and, is also well known, the track 14 usually has associated with it a moving chain or other powered element for moving the trolley 12 along the track, and switches are generally included in the system for directing the trolleys and hangers to various desired points in the plant. When a trolley and associated hanger 10 reach a work station the trolley is generally separated or separable from the driving chain or the like so that the trolley and hanger can remain stationary relative to the work station while the operator loads and/or unloads material onto or from the hanger.

Each of the quantities of material 16, 18 and 20, hung from the hanger 10 in FIG. 1, may consist of either a single workpiece or a group or stack of such workpieces, made up of a number of layers of workpieces, and each workpiece may be in any given state of completion. That is, each work piece for example may be a single cut unworked pattern piece, a single pattern piece already worked with embroidery, buttonholing, hemming or the like, or a number of sewn-together pattern pieces further worked with embroidery, smocking, appliquing, etc. In the following discussion, including the claims, a quantity of work material such as indicated at 16, 18 and 20 in FIG. 1, will sometimes be referred to as a "unit" of work material with it being understood that such "unit" may consist of either a single workpiece layer or a number of workpiece layers superimposed to form a somewhat loose group or a neatly layered stack.

A workpiece hanger embodying the invention may be designed to include only one gripper for holding one workpiece unit, but preferably and as shown in the drawings, the hanger is capable of holding a number of units at one time. In particular, as illustrated in FIG. 1 and FIG. 2, the hanger 10 includes six grippers indicated generally at 22, 22, for holding as many as six workpiece units such as the two shown at 16 and 18. These grippers 22, 22 directly hold workpiece units to the hanger 10. Sometimes it may also be desired to indirectly suspend one or more workpiece units from the hanger through an auxiliary hanger or hangers, and for this purpose the hanger 10 also includes a number of eyes 24, 24, from each of which such an auxiliary hanger may be hung. An example of this in FIG. 1 is illustrated by the work unit 20 which is hung from one eye 24 by means of an auxiliary hanger 25. This auxiliary hanger may, for example, consist of a clothespin-type clamp which grips the work unit 20 and having a hook member insertable in the eye 24 as shown.

Reference may now be made to FIGS. 2 to 4 for further details of the construction of the hanger 10 of FIG. 1. The hanger consists of a body 28 of rigid material. This material may be wood, metal or plastic, and in the preferred case is a molded acetal plastic such as nylon which may be strengthened by the inclusion of glass fibers. The body 28 has a horizontal elongated upper portion 30 from which protrude seven horizontally spaced downwardly extending portions or fingers comprised of four first fingers 26, 26 and three second or intermediate fingers 28, 28 each located midway between a pair of the first fingers 26, 26, as illustrated. Further, the lower end of each first finger 26 includes one of the eyes 24, 24. The body may be made as a solid construction, but preferably both the upper portion 30 and the fingers 26 and 28 are of ribbed cross section, as evident from the drawings, to reduce the weight of and material required by the body while nevertheless preserving a high degree of rigidity.

The hanger body 28 is supported from the conveyor 12 by a hanger rod 38 suitably secured to the middle of the upper body portion 30 as, for example, by being inserted into an opening 42 in the upper body portion and held thereto by a rollpin 40 or the like extending through aligned openings in the upper body portion and in the hanger rod 38.

Each of the six grippers 22, 22 of the hanger 10 includes a fixed generally vertically extending gripping surface 46 on one of the fingers 26. In this connection, it will be observed that the two end fingers 26, 26 each have only one gripping surface 46 per finger while the other two, more inner, fingers 26, 26 each have two gripping surfaces 46, 46 facing in opposite directions. Furthermore, each fixed gripping surface 46 is shaped so that its lower end portion 48 as seen from the front, as in FIG. 2, is curved outwardly from the associated finger 26 so that such end portion 48 includes an upwardly directed component. In any event, each gripper 22 in addition to its fixed gripping surface 46 also includes a spring clip 50, made of spring material and having a rectangular cross section, fixed to the lower end of the second or intermediate finger 28 facing the involved gripping surface 46. The lower end of the second finger 28 is located somewhat below the curved lower end portion 48 of the gripping surface and the clip 50 has an inclined portion 51 which extends upwardly from said lower end of the second finger and laterally toward the associated fixed gripping surface 46. The clip 50 also has a curved free end portion 52 with a curvature generally matching that of the curved lower end portion 48 of the fixed gripping surface 46. The clip is otherwise so sized that when no material is held by the gripper the curved end portion 52 of the clip 50 rests against, or at least nearly engages, the curved portion 48 of the gripping surface 46 and is held in such position by the resiliency of the clip, the clip being resiliently movable away from such position to allow the insertion of a workpiece unit into the gripper.

Each clip 50 of the several grippers 22, 22 may be separate from its neighboring clip supported by the same second finger 28, but a feature of the present invention is that the illustrated design and arrangement of the first and second fingers 26, 26 and 28, 28 allows the pair of clips 50, 50 supported by each second finger 28 to be made of a single piece 54 of spring material, preferably of rectangular cross section as seen in FIG. 4, held to the lower end of the associated second finger 28 by a suitable fastening means such as the illustrated two screws 56, 56.

In the loading of a work unit into one of the grippers 22 of the hanger 10 the work unit may be lifted upwardly toward the gripper against the inclined portion 51 of the spring clip 50, the inclination of which guides the upper edge of the work unit into the mouth of the gripper with the spring clip 50 then yielding to allow the upper edge portion of the work unit to slip upwardly between the fixed gripping surface 46 and the spring clip 50 of the gripper. After the work unit has been moved upwardly a sufficient distance into the gripper the manual lifting force may be released allowing the work unit to tend to move downwardly by gravity. In doing so the frictional force between the work unit and the curved portion 52 of the spring clip, as well as the biasing force of the spring clip 50 itself, will tend to urge the curved portion 52 of the spring clip toward the curved portion 48 of the fixed gripping surface 46 to provide a firm grip on the work unit causing it to be reliably held by the hanger while the hanger is thereafter moved from one work station to another.

In the unloading operation involving a gripper 22 the gripped work unit may be removed from the gripper by merely pulling downwardly on the unit sufficiently to overcome the gripping force.

We claim:

1. A hanger for use in a conveyorized system for transporting limp sheet material from work station to work station, said hanger comprising a body having an upper portion and a first portion extending downwardly from said upper portion and a second portion extending downwardly from said upper portion in laterally spaced relation to said first downwardly extending portion, and a gripper associated with said body for releasably holding a unit of work material, said gripper comprising a generally vertically extending stationary gripping surface on said first downwardly extending body portion, said stationary gripping surface generally facing said second downwardly extending body portion and having a curved lower end portion curving somewhat toward said second downwardly extending body portion so as to have an upwardly facing component, and an elongated spring clip attached at a given point along the length thereof to the lower end of said second downwardly extending body portion, said lower end of said second downwardly extending body portion and said point at which said spring clip is attached thereto being located below said curved lower end portion of said gripping surface and said clip having an inclined portion bridging the space between said downwardly extending body portions which inclined portion extends upwardly from its said point of attachment to said lower end of said second downwardly extending body portion and toward said curved lower end portion of said gripping surface on said first downwardly extending body portion, said clip further having a curved end portion adjacent said inclined portion which curved portion has a curvature generally matching that of said curved end portion of said stationary gripping surface, said clip being further of such size and shape that said curved end portion thereof at least nearly engages said curved end portion of said fixed gripping surface when no work unit is inserted in said gripper, said spring clip being made of a resilient spring material so as to resiliently resist movement of said curved end portion of said clip away from said curved end portion of said fixed gripping surface, the inclination of said inclined portion of said clip upward from its point of attachment to said first downwardly extending body portion and toward said gripping surface causing a downward force exerted on said curved end portion of said clip by a unit of work material inserted between said curved end portion and said gripping surface to urge said curved end portion toward said gripping surface to more tightly grip said unit of work material, and said inclination of said inclined portion further causing an upwardly directed force exerted on said inclined portion during the upward insertion of a unit of work material into said gripper to urge said curved end portion of said clip away from said gripping surface to ease said insertion.

2. A hanger as defined in claim 1 further characterized by at least one of said downwardly extending portions of said hanger body having an eye at its lower end for receiving a supplemental hanger.

3. A hanger as defined in claim 1 further characterized by said upper portion of said hanger body being horizontally elongated and said hanger body including a plurality of first body portions in the form of first fingers spaced horizontally from one another and extending downwardly from said upper portion and a plurality of second body portions in the form of second fingers spaced horizontally from one another and extending downwardly from said upper body portion with said first and second fingers alternating with one another along the length of said upper body portion, and said gripper being one of a plurality of grippers each of which grippers includes a fixed stationary gripping surface defined by one of said first fingers, each of said second fingers being located between two of said first fingers, and each of said second fingers having two spring clips attached to its lower end each forming a part of a respective one of two grippers located on opposite sides of said second finger.

4. A hanger as defined in claim 3 further characterized by said two spring clips attached to said lower end of each second finger together being comprised of a single length of spring material.

* * * * *